United States Patent [19]

Swanson et al.

[11] 3,968,814
[45] July 13, 1976

[54] HYDRAULIC BOOSTER BRAKE PRESSURE REGULATOR

[75] Inventors: Kenneth B. Swanson, Bannister; Kenneth D. Jensen, Owosso, both of Mich.

[73] Assignee: Midland-Ross Corporation, Cleveland, Ohio

[22] Filed: Jan. 14, 1975

[21] Appl. No.: 540,997

Related U.S. Application Data

[63] Continuation of Ser. No. 346,854, April 2, 1973, abandoned.

[52] U.S. Cl. .................................. 137/505.18
[51] Int. Cl.[2] ............... F16K 17/34; F16K 31/363
[58] Field of Search ............ 137/505, 505.18, 505.13

[56] References Cited
UNITED STATES PATENTS

| 219,114 | 9/1879 | Ross | 137/505.18 |
|---|---|---|---|
| 913,650 | 2/1909 | Senter | 137/505.13 X |
| 1,294,151 | 2/1919 | Page | 137/505.18 X |
| 2,920,647 | 1/1960 | Mercier | 137/505.18 |
| 3,796,134 | 3/1974 | Kaptrosky | 91/418 |

FOREIGN PATENTS OR APPLICATIONS

| 122,513 | 10/1946 | Australia | 137/505.13 |

*Primary Examiner*—Irwin C. Cohen
*Attorney, Agent, or Firm*—Irvin L. Groh

[57] ABSTRACT

A hydraulic booster brake mechanism for use in an open center power steering system of a motor vehicle in which the booster brake mechanism employs a pressure regulating mechanism which limits the maximum pressure at which the booster operates to protect the hydraulic brake system and which operates to make the maximum pressure available when the pressure decreases. The pressure regulating mechanism operates to limit and to make available the maximum pressure when the pressure increases or decreases from a predetermined value by minimizing the effects of frictional forces and dynamic fluid flow by utilizing a control plunger which moves between open and closed positions on fluid trapped in a plurality of grooves which also act as seals. The fluid utilized by the booster is supplied to and delivered from additional grooves which not only assist the sealing grooves but minimize the effect of the flowing fluid. Moreover, the fluid is transported between inlet and outlet within the plunger to minimize the effect of flowing fluid.

3 Claims, 2 Drawing Figures

HYDRAULIC BOOSTER BRAKE PRESSURE REGULATOR

This is a continuation of application Ser. No. 346,854, filed Apr. 2, 1973, now abandoned.

SUMMARY OF THE INVENTION

This invention relates to hydraulic booster brake mechanisms for use in the brake system of a motor vehicle and more particularly to a hydraulic booster brake mechanism employing a pressure regulating mechanism which limits the pressure at which the booster operates.

In hydraulic brake booster mechanisms which are used with hydraulic power steering systems, particularly those that utilize the variable pressure supplied by the power steering pump during the time that steering corrections are being made and which also include throttling valve means by which the pressures delivered by the power steering pump can be increased to a magnitude required for operating the brake booster, it is necessary to protect not only the power steering pump from excessive pressure but also to limit the maximum pressure which operates the booster. In the booster, an excessive pressure will permit the brakes to be actuated with a force that can cause damage to the braking mechanism at the wheels. Likewise, an excessive pressure at the power steering pump will operate a pressure relief valve which protects the power steering pump from damage but disables the power steering system. Consequently, it becomes necessary to limit the maximum pressure which can be supplied to the booster. A pressure regulating valve or other mechanism may be used for this purpose but it becomes necessary that the valve opens and closes at substantially the same pressure. Unless such operation is achieved, the operation of the hydraulic booster will be erratic, particularly at runout, the point at which all available pressure has been utilized and additional increments of braking force, if any, must be supplied by the physical effort of the operator. At the runout point, the pressure regulating valve isolates the booster from the source of pressure fluid but by adding physical force, the volume of the power chamber is increased and the pressure is reduced. The reduction in output force due to the reduction in pressure must be supplied either by the operator, which is not desirable, or by the booster which necessitates the opening of the pressure regulating valve very near to its closing pressure to open the variable pressure source to the booster.

In prior art pressure regulating mechanisms, the operation has not been satisfactory since the opening and closing pressures have been at substantially unequal values. As a consequence, the differential in operating pressures has given a sensation to the operator of a reduction in brake effect even though the pedal effort is being increased by the operator. In fact, tests comparing the effort applied and the resultant output establish this.

It is an object of the invention to provide a hydraulic booster brake mechanism incorporating a pressure regulating valve which responds at a predetermined pressure level to a pressure increase to close and isolate the booster from the source of variable pressure and which responds at a substantially equal pressure level to a pressure decrease to open the booster to the source.

It is another object of the invention to provide a hydraulic booster incorporating a pressure regulating valve which will close and remain closed as the pressure attains a predetermined level and which will open at substantially the same pressure as the pressure drops below that level.

It is a further object of the invention to provide an hydraulic booster incorporating a pressure regulating valve which operates between open and closed positions at a minimum pressure differential by minimizing the effects of friction and dynamic flow by employing fluid receiving grooves some of which act as seals and others of which receive and deliver fluid and all of which act to suspend the closure member for easy, pressure responsive movement.

A hydraulic booster brake mechanism is provided which incorporates a pressure regulating valve in which annular grooves act to suspend a sliding control plunger in its bore on fluid which seeps between the plunger and the bore for easy sliding movement of the plunger between open and closed positions. In the open position a chamber in the plunger communicates one of the grooves which is open to a supply of fluid to another of the grooves from which it is delivered to the control mechanism of the booster to minimize the effects of fluid flow on the plunger. The grooves act as fluid seals obviating the need for conventional seals creating friction which must be overcome and at the same time lubricate the plunger, all for easy, substantially friction free movement.

DETAILED DESCRIPTION

Figure 1:
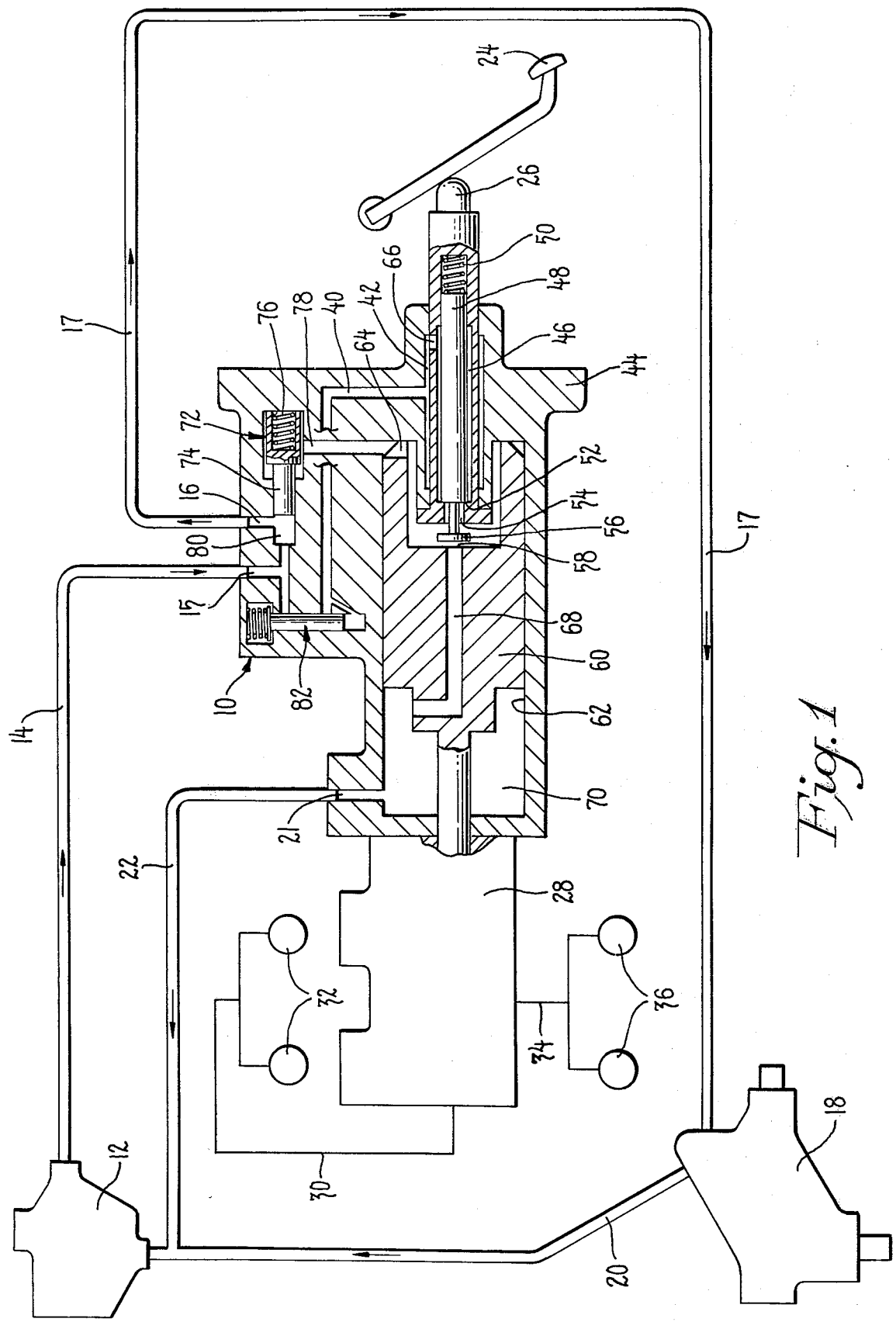
FIG. 1 is a schematic showing of the hydraulic booster brake mechanism embodying the present invention shown in its relationship to associated components of a vehicle braking system and a vehicle power steering system.

Referring to the drawings and particularly to FIG. 1, a hydraulic booster brake mechanism 10 is incorporated in a power steering system of the open center type in which a power steering pump 12 continuously circulates hydraulic fluid through a line 14 to an inlet port 15 in the hydraulic booster brake mechanism 10 and through the power brake mechanism 10 to an outlet port 16 connected by a line 17 to a power steering gear 18 of a type used for power steering of a motor vehicle. The power steering pump 12 normally circulates fluid to the power steering gear 18 in a range of approximately 30 psi to 1200 psi depending on whether or not a steering correction is being made by the operator. Hydraulic fluid is returned from the power steering gear 18 through a return line 20 to a fluid reservoir associated with the power steering pump 12. The return pressure of the hydraulic fluid is approximately five psi. The fluid circulated from the power steering pump to the power steering gear is utilized during operation of the power brake mechanism 10 and the fluid utilized is returned through an outlet port 21 to a conduit 22 and to the reservoir of the power steering pump 12.

The power brake mechanism 10 is actuated by a foot pedal 24 which moves an input member 26 to control operation of the power brake 10 to increase the pressure in a conventional dual master cylinder 28 to transmit hydraulic pressure through a brake line 30 to the front brakes 32 of the vehicle and through a brake line 34 to the rear brakes 36 of the vehicle.

The variable pressure fluid which is supplied by the power steering pump 12 to the inlet 15 also is supplied through a passage 40 to an annular chamber 42 formed in the housing 44 of the booster 10 and surrounding the input member or plunger 26. The plunger 26 has an axially extending cavity 46 in which a valve rod 48 is slidably disposed and is urged by a spring 50 so that a shoulder 52 on the rod 48 closes, a valve inlet port 54 at the end of the plunger 26. The valve rod 48 is provided with a forwardly extending portion forming an exhaust valve element 56 which is normally spaced from an exhaust valve port 58 in a power piston 60 reciprocably mounted in a bore 62 of the booster housing 44. The piston 60 forms a power chamber 64 in the bore 62 at one side of the power piston 60 which is adapted to receive fluid under pressure to move the power piston 60 to the left from the position shown in FIG. 1 for actuation of the master cylinder 28 and the brakes 32 and 36.

Pressure supplied to the annular chamber 42 is utilized by the control means formed by the inlet valve 52, 54 and exhaust valve 56, 58 to admit fluid under pressure to the power chamber 64 for movement of the power piston 60 to the left as viewed in FIG. 1 for operation of the master cylinder 28 and the brakes. Brake application is accomplished by depressing the foot pedal 24 which moves the input member 26 and valve rod 48 to the left as a unit until the exhaust valve element 56 engages the power piston 60 and closes exhaust port 58. Subsequent movement of the pedal 24 causes plunger 26 to move relative to the now stationary valve rod 48 so that plunger 26 moves against the resistance of spring 50 and shoulder 52 separates from the inlet valve element and opens port 54. Variable pressure fluid is admitted from the annular chamber 42 through a radial passage 66 to the plunger cavity 46 and through valve inlet port 54 to the power chamber 64 causing the piston 60 to move to the left to operate the master cylinder 28. Release of the pedal 24 results in closing of the inlet valve 52, 54 and the subsequent opening of the exhaust valve 56, 58 so pressure in the power chamber 64 is released through the exhaust port 58 and a passage 68 in the power piston 60 to an exhaust chamber 70 formed in the booster housing 44 and to the return port 21 and the line 22 to the power steering pump 12.

The variable pressure fluid which is supplied to the booster inlet port 15 and from there to the annular chamber 42 is at a magnitude which is determined by the output of the power steering pump which in turn depends on whether or not a steering correction is being made. The power steering pump normally delivers pressure at approximately 30 psi when no steering corrections are being made and under steering conditions this pressure can increase to as much as 1200 psi. If the pressure being delivered to the booster 10 is not sufficient for its operation during a brake application, the pressure supplied to the annular chamber 42 is increased to the required magnitude by a throttling or pressure demand valve 72.

The pressure demand valve 72 is in the form of a stepped plunger 74 slidably supported in a bore in the booster housing 44 and having a larger end exposed to a chamber 76 which communicates by way of a passage 78 with the power chamber 64. The other end of the plunger 74 is smaller and is exposed to pressure in a chamber 80 which communicated with the inlet port 15 and with the outlet port 16. The plunger 74 moves to the left to restrict the passage between inlet port 15 and outlet port 16 thereby requiring the pump 12 to deliver a higher pressure. The further the plunger 74 moves to the left, the more restricted the flow of fluid and the higher the pressure which will be established at the inlet port 15. The plunger 74 is urged to the left by the pressure in the power chamber 64 and is resisted by the pressure at the inlet port 15 acting to the right on the plunger 74. The differential in size between the two ends of the plunger 74 insures that the pressure at the inlet port 15 is maintained at a slightly higher pressure than the pressure being utilized by the booster 10 in the power chamber 64.

A booster employing a pressure demand valve and control valve mechanism is described in detail in the U.S. Pat. No. 3,796,134 of Albert F. Kaptrosky for Hydraulic Booster Brake Mechanism.

The pressure which is supplied to the control means or valve mechanism 52, 54 and 56, 58 of the booster 10 is determined by the output of the steering pump 12 when steering corrections are being made or by the pressure demand valve 72 during brake actuation. The maximum pressure which can be supplied is determined by a pressure regulating valve 82 which is shown in FIG. 1 as located between the inlet port 15 from the power steering pump 12 and the control means 52, 54 and 56, 58 of the booster 10.

Figure 2:
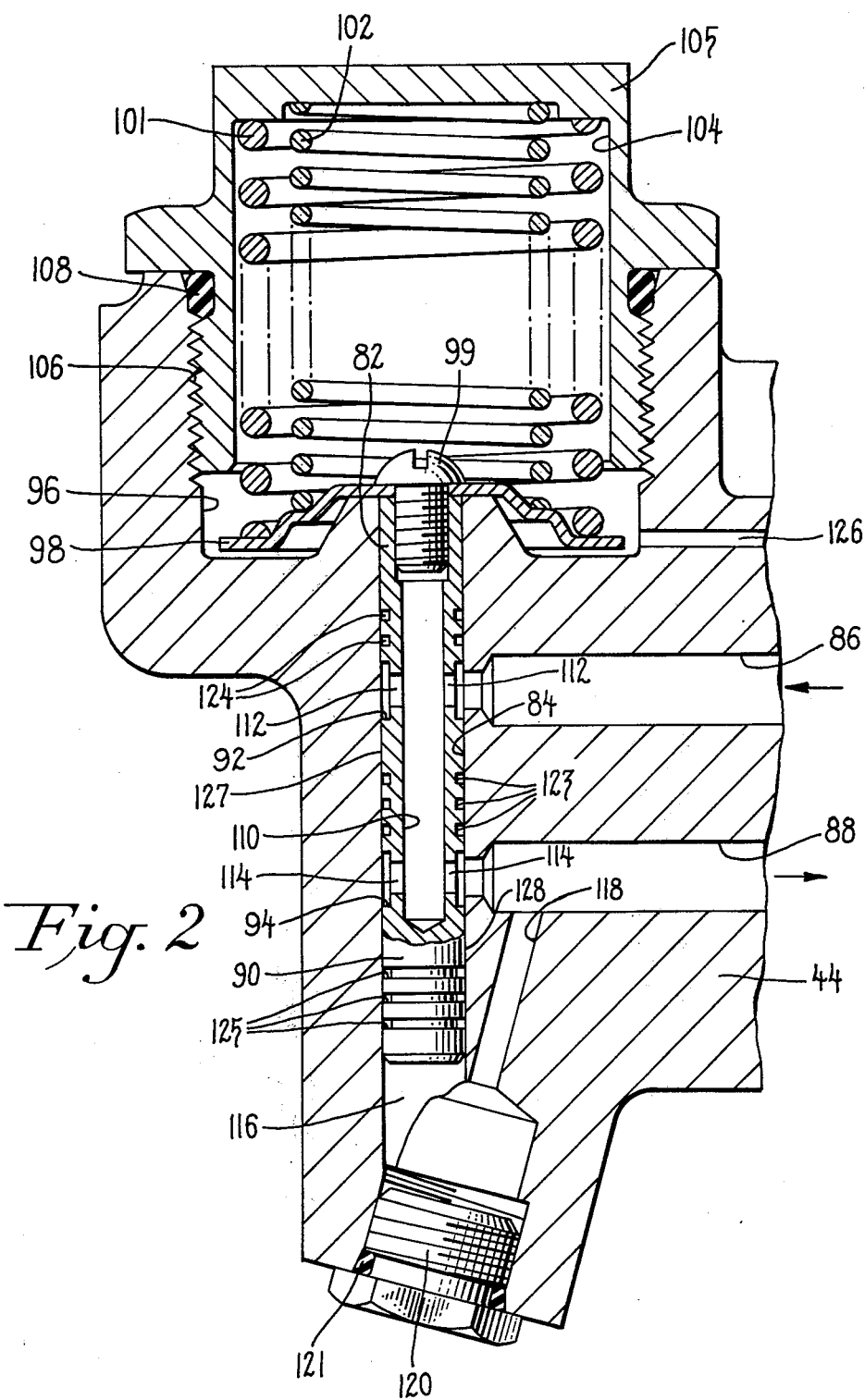
FIG. 2 is a longitudinal, sectional view of the pressure regulating portion of the hydraulic booster shown in FIG. 1.

As best seen in FIG. 2, the pressure regulating valve 82 includes a bore 84 in the booster housing 44 having an inlet passage 86 communicating with the inlet port 15 and an outlet passage 88 communicating with the passage 40 to the annular chamber 42 and the booster control valve mechanism. An elongated plunger 90 is slidably disposed in the bore 84 and its exterior is formed with a pair of relatively wide annular grooves 92 and 94 which in the position shown, communicate with the inlet passage 86 and outlet passage 88, respectively. The upper end of the plunger 90 projects into an enlarged bore portion 96 and has a disc element 98 secured to the plunger 90 by means of a screw 99. The disc element 98 forms a seat for the lower ends of a pair of concentrically mounted, low rate springs 101 and 102. The opposite upper ends of the springs 101 and 102 are seated in a blind bore 104 formed in a cap member 105 which is threaded into an opening 106 in the booster housing 44 and sealed in fluid tight relation by a seal 108.

The plunger 90 has an elongated, axial chamber 110 formed by a blind bore which has its open end closed in fluid tight relation by the screw 99 which holds the disc 98 on the plunger 90. The chamber 110 communicates with the inlet groove 92 by means of a pair of aligned radial passages 112 and with the outlet groove 94 by means of another pair of aligned radial passages 114. In the position shown in FIG. 2, fluid under pressure is free to pass through the inlet passage 86 to the inlet groove 92 and through the radial passages 112 to the chamber 110 from which it passes through the radial passages 114 to the outlet groove 94 and to the outlet passage 88 to the annular chamber 42.

The lower end of the plunger 90 forms a control chamber 116 in the bore 84 which continuously communicates by way of an angularly disposed passage 118 with the outlet passage 88. The end of the angular passage 118 and control chamber 116 is sealingly closed by a plug 120 and seal 121 fitted into an opening in the booster housing 44.

The plunger 90 also is provided with a plurality of narrow, annular grooves 123, 124 and 125. A group of grooves 123 are disposed between the radial passages 112 and 114; a pair of grooves 124 are disposed adjacent the upper end of the plunger 90 and a group of grooves 125 are disposed adjacent the lower end of the plunger 90. The variable pressure fluid which tends to seep between the plunger 90 and the wall of the bore 84 enters the grooves 123, 124 and 125 and tends to support the plunger 90 in exact axial alignment with the axis of the bore 84 thereby making the minimum annular clearance between the bore 84 and plunger 90 as uniform as possible which minimizes the seepage of fluid under pressure. In this manner, the grooves 123, 124 and 125 not only form fluid receiving movement but also act as seals which minimize fluid seepage between the bore and plunger as well as lubricating the plunger for easy sliding movement. Any fluid which may seep past both of the grooves 124 and into the chamber 96 is free to communicate through the bleed passage 126 to the return line 21 (FIG. 1) which is at the lowest pressure in the system.

The plunger 90 is also formed with annular land surfaces 127 and 128. The land portion 127 is disposed between the grooves 123 and the inlet groove 112 and the land portion 128 is disposed between the annular grooves 125 and the outlet groove 94. Pressure of the fluid in the control chamber 116 which reaches a magnitude sufficient to overcome the springs 101 and 102 moves the plunger 90 upwardly as seen in FIG. 2 so that land 127 obstructs the inlet 86 and land 128 closes the outlet 88. In this manner, both the inlet and outlet are separately closed and are isolated from each other and from the chamber 110.

The relatively wide inlet groove 92 and outlet groove 94 also act similarly to the grooves 123, 124 and 125 in suspending the plunger in its bore. In the open position of the plunger, circulating fluid flows around the annular grooves and in the closed position fluid is trapped in the grooves 92 and 94.

Under normal operating conditions fluid under pressure delivered to the inlet 86 from the power steering pump 12 is free to pass through the pressure regulating valve 82 to the annular chamber 42 and to the control means formed by the inlet valve 52, 54 and outlet or exhaust valve 56, 58. However, when the pressure at the inlet approaches some predetermined maximum, as for example when a steering correction is being made or when the booster 10 is being actuated with a pressure that approaches the predetermined maximum, the pressure regulating valve 82 closes because the pressure at the inlet is also established in the control chamber 116 causing the plunger 90 to move upwardly against the biasing action of the springs 101, 102. Thereafter, any increase in pressure of the fluid being delivered by the power steering pump 12 is isolated from the booster 10. Moreover, the booster 10 cannot activate the pressure demand valve to require more pressure of the power steering pump 12 because a pressure would be required in the demand valve chamber 76 in excess of the predetermined value.

The pressure regulating valve 82 will remain closed as long as the pressure in the annular chamber 42 is maintained at the predetermined level by operation of the booster 10. The plunger 90 will move downwardly under the action of the springs 101 and 102 to open the inlet and outlet ports 86 and 88 when the pressure in the annular chamber 42 and therefore in the control chamber 116 drops below the predetermined value. At that time, if the pressure from the power steering pump 12 is in excess of the predetermined value, the pressure will be increased in the annular chamber 44 and in the control chamber 116 to the predetermined value at which time the pressure regulator 82 will again close the inlet 86 and outlet 88. On the other hand, if the pressure from the pump 12 is less than the predetermined value, the pressure regulating valve 88 will remain open until either the pump 12 supplies an excessive pressure as a result of steering corrections or until the maximum pressure is demanded by the pressure demand valve 72.

In actual practice, with a booster operating at a predetermined maximum pressure of 800 psi, the pressure regulating valve 82 would ideally close when the pressure increases to the 800 psi level and would instantly reopen when the pressure decreases below 800 psi. Such ideal conditions, however, cannot be realized because of friction between moving parts and the dynamics of the relatively high pressure fluid. In an actual embodiment of the invention, the pressure differential between closing and opening was found to be reduced to less than 20 psi whereas prior art devices were found to operates with as much as 100 psi or more pressure differential.

In the present embodiment of the invention, the minimizing of the differential between opening and closing pressures was considered to result from the elimination of conventional seals on the plunger which would add frictional resistance. The annular grooves 123, 124 and 125, on the other hand, suspend the plunger 90 on a uniform layer of fluid to minimize friction and at the same time minimize pressure seepage to the point where conventional seals are not required. In addition, the low rate springs 101, 102 permit relatively large movement of the plunger 90 without substantially increasing the force which must be provided to overcome the springs at the selected, predetermined pressure level. Still further, the pressure fluid entering the inlet 86 and leaving at the outlet 88 first pass through annular grooves 92 and 94, which like the sealing grooves 123, 124 and 125, aid in suspending the plunger 90 for easy sliding movement and the pressure fluid is transported between the inlet 86 and outlet 88 by the axial chamber 110 which minimizes the effect of axially flowing fluid in the bore 84 which would otherwise act on the plunger 90.

The importance of a low pressure differential between opening and closing pressures of the pressure regulating valve 82 is of particular importance at the so called runout point of the booster 10. This is the point at which the maximum available pressure, for example, 800 psi, has been utilized for braking and any additional output force acting on the master cylinder 28 must be produced by the physical effort exerted by the operator on the pedal 24. When this occurs, the plunger 26 and valve rod 48 come into contact with the power piston 60 and forces it to the left to add to the output on the master cylinder 28. However, as the power piston 60 moves to the left, the volume of the fluid in the power chamber 64 increases thereby decreasing the pressure below 800 psi. If the pressure drop is not immediately remedied by supplying the additional pressure to return the pressure in the power chamber to the maximum of 800 psi, the diminished output force due to the lacking pressure must be supplied by the force of the operator on the pedal. To supply the pressure reduction, the pressure regulating valve 82 must open at substantially the same pressure at which it closed. For example, if the runout point is at 800 psi in the power chamber and if the pressure regulating valve does not reopen until the pressure has been reduced to 700 psi, the output force of the booster due to the 100 psi of pressure must now be supplied physically by operator effort. This results in a peculiar, unpleasant sensation to the operator at the runout point since there will be an actual reduction in braking output even though the foot of the operator has exerted additional force. With the present embodiment of the invention, this form of operation is avoided and the transition from power assisted braking at the runout point is without a brake output drop.

It will now be seen that a hydraulic booster has been provided which incorporates a pressure regulating valve that closes to limit the maximum pressure at which the booster operates and also opens to make pressure available to supply any deficiency in pressure, with both the opening and closing occurring at substantially the same pressure level. This is accomplished by minimizing frictional and fluid flow effects on the pressure regulating valve by employing a grooved plunger which seals the plunger on layers of fluid which also act to lubricate the plunger and by directing the flow of fluid through the plunger to minimize the effects of fluid flow.

What is claimed is:

1. A pressure regulator comprising a housing, an elongated bore in said housing, spaced fluid inlet and outlet ports communicating with said bore, an elongated plunger slidable in said bore between first and second positions, a plurality of annular grooves formed in and spaced longitudinally of said plunger, said plunger forming a longitudinally extending chamber therein, said chamber being closed at its opposite ends and having first and second passages communicating said chamber with a first one and a second one of said plurality of annular grooves, respectively, closure securement means closing an end of said chamber and connecting a support means to said plunger, a third one of said grooves being disposed between said first and second grooves and forming an open groove seal preventing communication therebetween, a fourth one of said grooves being disposed between one end of said plunger and said first groove, a fifth one of said groves being disposed between the other end of said plunger and said second groove, said fourth and fifth grooves each forming open groove seals preventing communication between the ends of said plunger and said first and second grooves, said first one and second one of said grooves being in communication with said inlet and outlet ports when said plunger is in its first position, a control chamber formed in one end of said bore and being continuously open to said outlet port, resilient means acting on said support means and urging said plunger to said first position with a predetermined force and maintaining said plunger in said first position when the pressure at said outlet is below a predetermined pressure, said plunger being movable to a second position in which said inlet and outlet ports are simultaneously closed by said plunger from communication with said first and second ones of said passages in response to a pressure greater than said predetermined pressure at said outlet and in said control chamber acting on said plunger to exert a force greater than the predetermined force of said resilient means.

2. The combination of claim 1 in which additional grooves of said plurality of grooves are longitudinally spaced at opposite sides of said first and second ones of said grooves forming open groove seals.

3. The combination of claim 1 in which said first and second passages extend transverse of said plunger and in which additional grooves of said plurality of grooves are disposed at opposite sides of each of each of said first and second passages forming open groove seals.

* * * * *